United States Patent Office 2,695,743
Patented Nov. 30, 1954

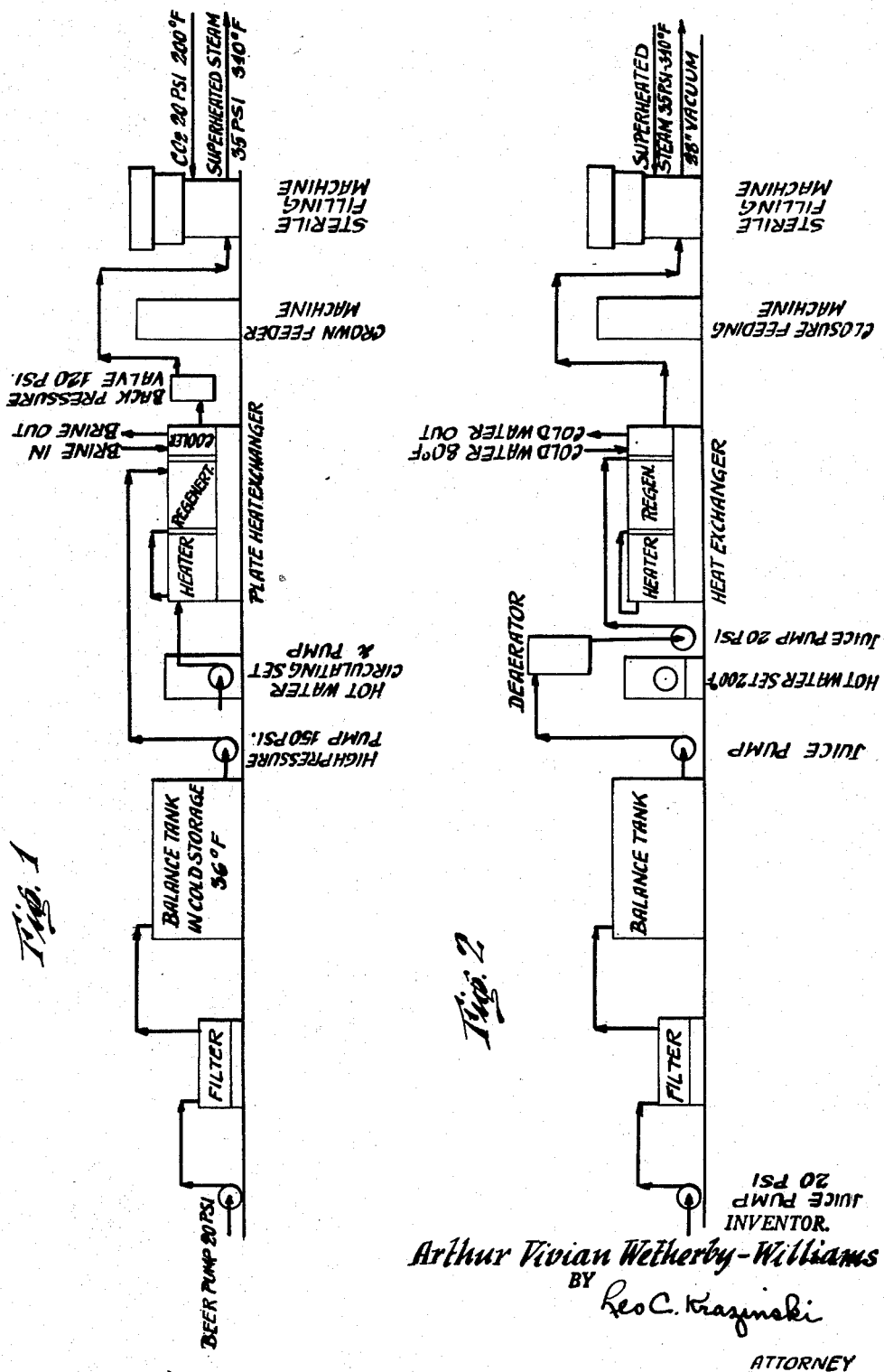

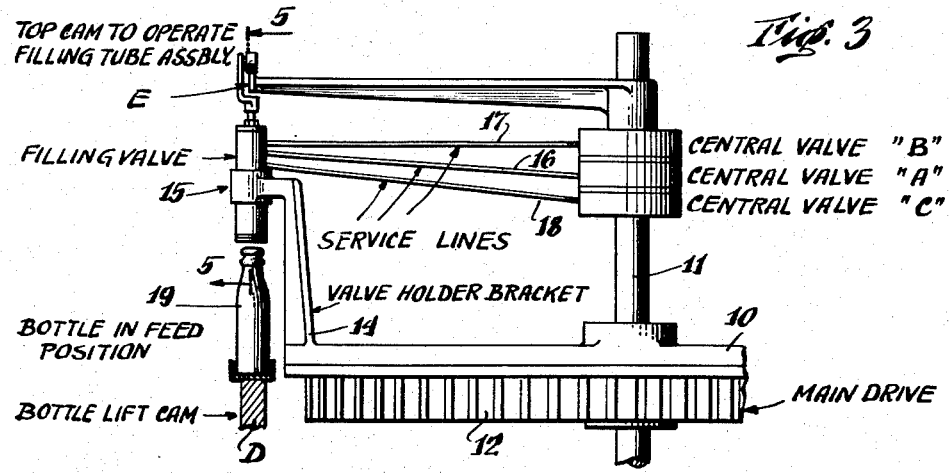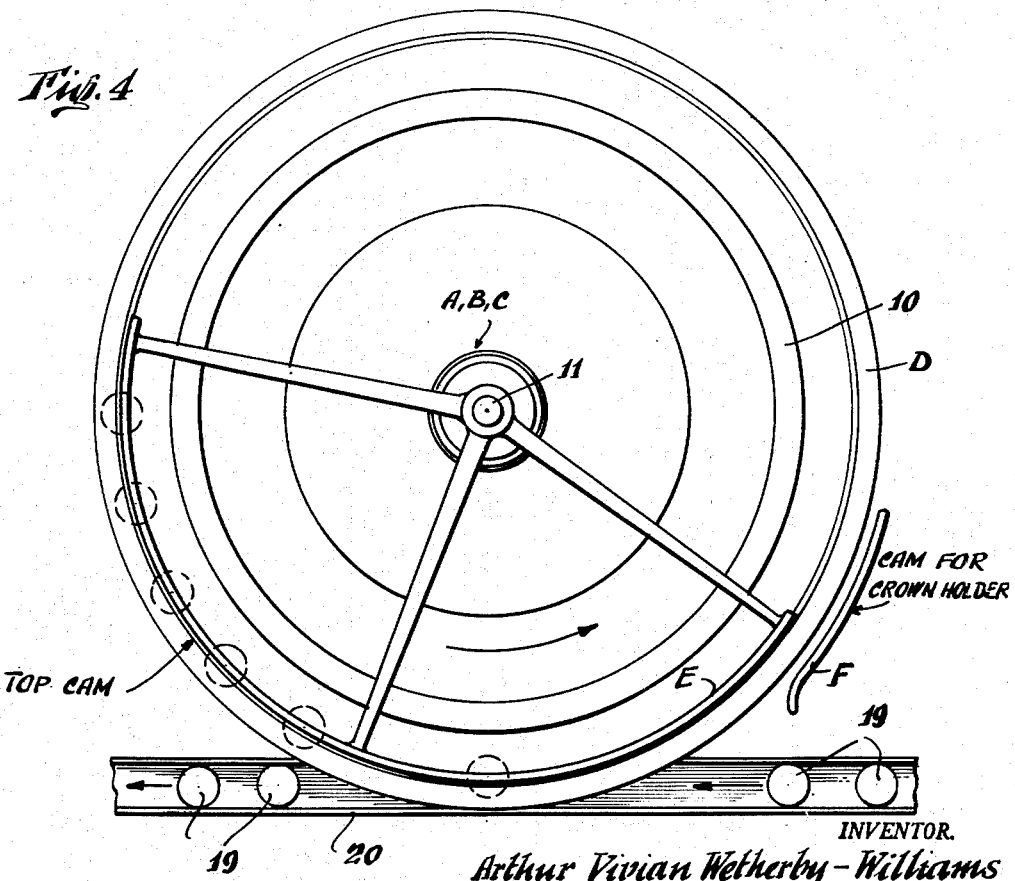

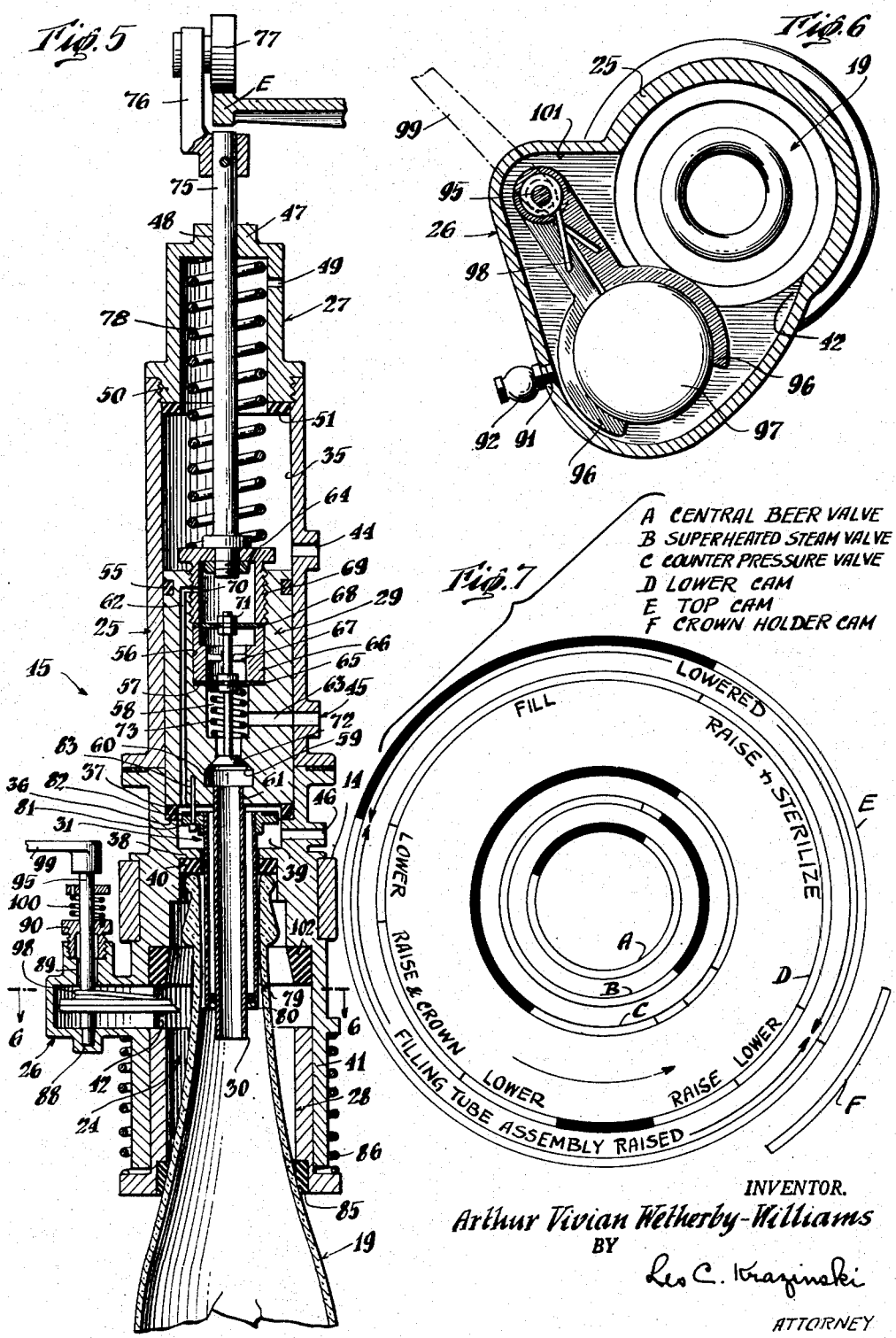

2,695,743

STERILE FILLING AND CLOSING MACHINE

Arthur Vivian Wetherby-Williams, Mexico City, Mexico, assignor of one-half to Washington Kyle Sheffield, New London, Conn.

Application November 20, 1951, Serial No. 257,275

13 Claims. (Cl. 226—98)

The present invention relates to container filling and closing machines, and, more particularly, to a machine for filling containers with liquids, such as beer, fruit or vegetable juices, and other fluid food products, and closing the containers in a manner to provide a sterile package without further processing treatment being required to assure that the contents will remain sterile.

It has been found that the hot filling of fruit and vegetable juices and the like and the heat processing thereof in sealed containers spoils the natural flavor and reduces the vitamin content thereof. Likewise, it has been found that the pasteurization of beer in bottles or cans affects the flavor thereof. Also, such heat processing of these products in the container involves an additional expense due to the requirement of equipment and floor space and the operating cost involved. In recent years, it has been found that the sterilization of beer and fruit juices in bulk can be successfully accomplished, however, no successful sterile filling machine for packaging such products has been available.

Accordingly, the present invention aims to provide a machine for filling containers with products which have been sterilized or pasteurized in bulk and for closing the containers in a manner to maintain the product sealed in the container completely sterile.

An object of the present invention is to provide a machine which accomplishes the foregoing in a practical and reliable manner.

Another object is to provide an improved filling head, valving and valve operating devices for accomplishing the foregoing, which can be readily embodied in existing filling and closing machines of the automatic, rotary, high capacity type.

Another object is to provide such a filling head which is simple, compact and economical in construction and can be readily taken apart for cleaning and can be readily reassembled.

A further object is to provide such a filling head which maintains the container and closure portions with which the product comes in contact completely sterile during the filling and closing operation.

A still further object is to accomplish the foregoing without any reduction in the capacity of the machine, as compared with existing machines for filling and closing similar containers.

Other and further objects will be obvious upon an understanding of the illustrative embodiment about to be described, or will be indicated in the appended claims, and various advantages not referred to herein will occur to one skilled in the art upon employment of the invention in practice.

In accordance with the present invention, it has been found that the foregoing objects can be accomplished by providing a machine having filling heads which include means for forming a chamber about the open end of containers and means operable during the movement of the machine for selectively applying a counter pressure and directing steam and liquid with which the containers are to be filled into and/or about the containers at predetermined intervals.

In a preferred embodiment illustrated herein, the present invention is described in connection with a machine for filling crown capped bottles or cans with a pre-sterilized liquid, such as beer, wherein the counter pressure is applied by a compressed gas which also assists in the valve operation within the head and wherein provision is made for sterilizing the crown caps or other closures and the containers for maintaining the same in a sterile atmosphere until the filling and closing operations have been completed.

In the drawings:

Fig. 1 is a flow diagram of a process for pre-sterilizing beer in bulk and directly filling and sealing the same in containers.

Fig. 2 is a similar flow diagram of a process for pre-sterilizing fruit juice in bulk and directly filling and sealing the same in containers.

Fig. 3 is a fragmentary schematic elevation view of a machine in accordance with the present invention.

Fig. 4 is a plan view of the machine shown in Fig. 3.

Fig. 5 is an enlarged longitudinal sectional view of the filling heads of the machine, taken substantially along the line 5—5 of Fig. 3.

Fig. 6 is a sectional view taken along the line 6—6 on Fig. 5, illustrating mechanism for removing the closures from the containers and maintaining them in a sterile atmosphere until they are replaced and sealed to the containers.

Fig. 7 is a chart which schematically illustrates the operating cycle of the machine.

Referring to the drawings in detail and, more particularly to Fig. 1 thereof, there is shown a flow diagram for pre-sterilizing beer and bottling the same in a sterile manner. Describing this diagram from left to right, beer is pumped at about 20 pounds per square inch through a filter and then into a balance tank where it is maintained in cold storage at about 36° F. The beer is withdrawn from the tank by a high pressure pump and is introduced into a heat exchanger at a pressure of about 150 pounds per square inch. The heat exchanger effects sterilization of the beer, and includes a heater, a regenerator and a cold brine type cooler for reducing the temperature of the beer. The beer then passes through a back pressure valve set at about 120 pounds per square inch and to the flow control valve of a filling machine which utilizes carbon dioxide gas at about 20 pounds per square inch and 200° F. as a counter pressure medium and utilizes superheated steam at about 35 pounds per square inch and 340° F. as a container and closure sterilizing medium, the containers being fed to the filling machine with the closures thereon.

In Fig. 2, a similar flow diagram is shown which illustrates that the filling machine about to be described in detail, with slight modification thereof, is adapted for bottling or canning fruit juices or other juices which have been pre-sterilized. Describing this diagram from left to right, juice is pumped at about 20 pounds per square inch through a filter and then into a balance tank. A second pump withdraws the juice from the tank and introduces the same into a deaerator through which the juice flows and then enters a heat exchanger. The heat exchanger effects sterilization of the juice, and includes a heater, a regenerator and a cold water type cooler. The juice having passed through the heat exchanger is conducted to the flow control valve of a filling machine which utilizes super-heated steam at about 35 pounds per square inch and about 340° F. as a sterilizing medium for the containers and closures supplied to the machine. Since the juice is filled into the containers at a relatively low pressure and is less likely to foam than beer, the counter pressure medium can be applied in the form of a negative pressure of 28 inches of mercury which exhausts the air from the containers and assists in the filling thereof.

Referring now to Figs. 3 and 4, there is shown a fifty head rotary type filling and closing machine embodying the present invention for filling crown capped bottles or cans with beer or similar beverages. This machine is illustrated schematically and only one of the filling heads is shown, because the general structure of such machines is well known and does not constitute any part of the present invention.

Generally described, this machine comprises a horizontal table or spider 10 which is rotated about a vertical shaft 11 by a main drive 12, and has a plurality of upright brackets 14 (of which only one is shown) each supporting a container filling and closing head 15 in accordance with the invention.

Central valves A, B, and C of the multiple type, each having outlets corresponding in number to the heads 15 and being respectively connected to inlets of the heads by service lines 16, 17, and 18, are supported on the shaft 11 or other structure of the machine and are constructed and arranged to respectively supply beer, steam and carbon dioxide at predetermined intervals. The internal construction of such valves and their operating mechanism is well known in the art and need not be described herein.

A circular cam D surrounds the table for raising and lowering bottles 19 or the like under the heads which are delivered and taken off by a conveyor 20 in the usual manner. A top cam E in the form of a circular segment for effecting certain operations of the heads, is supported by the shaft 11, and a closure holder operating cam F is supported adjacent the path of the heads.

A container filling and closing head 15 is illustrated in detail in Figs. 5 and 6 which is particularly adapted for use in connection with crown capped cans or bottles of the non-return type, such containers being capped immediately upon manufacture to prevent foreign matter from entering the same and thus being clean without further washing prior to delivery to the filling and closing machine.

The filling head shown generally comprises a casing 25 including a crown cap handling mechanism housing 26; a closure 27 for the upper end of the casing; a sleeve 28 for forming a chamber 24 about the upper end of the bottle; a valve head 29 slidably mounted in the casing and adapted to be raised and lowered by mechanism associated with the cam E and including passages, ports and valve elements as about to be described; a filling tube 30 supported by the valve head; and a snifter tube 31 associated with the filling tube and the valve head.

The casing 25 is generally tubular and has a stepped internal bore providing, from top to bottom, a cylinder 35 for the valve head, a shoulder 36 supporting a gasket 37 adapted to be engaged by the lower end of the valve head, an inwardly extending annular flange 38 providing a chamber 39 beneath the valve head, a bottle mouth sealing gasket 40 on the underside of the flange, a lower section 41 for slidably receiving the sleeve 28 and cooperating therewith to form the chamber 24, an opening 42 between the chamber 24 and the cap housing 26, an inlet 44 at about the middle of the cylinder 35 to which the steam line 17 is connected, an inlet 45 adjacent the lower end of the cylinder 35 to which the beer line 16 is connected, and an inlet 46 for the chamber 39 to which the carbon dioxide line 18 is connected.

The closure 27 constitutes a cup-shaped member having an upper end wall 47 formed with a central opening 48, a vent 49, and a plug portion 50 screw threaded into the upper end of the casing and supporting a gasket 51 adapted to be engaged by the upper end of the valve head.

The valve head 29 has a cylindrical outer contour formed with a recess for receiving a packing ring 55; and has a stepped internal bore providing from top to bottom an enlarged upper portion 56, a shoulder 57, an inlet chamber 58, a downwardly facing valve seat 59, a valve chamber 60, and a constricted lower end portion 61 in which the upper end of the filling tube 30 is secured. The valve head further has a duct 62 which runs from the upper portion 56 to the lower end thereof in communication with the chamber 39, and has a lateral port 63 for selectively establishing communication between either of the casing inlets 44 and 45 and the inlet chamber 58.

The valve head has associated therewith a valve and pressure actuated means for the valve which comprise a lower diaphragm 65 seated on the shoulder 57, a retainer bushing 66 for the diaphragm having a central stem guide 67, an upper diaphragm 68 on the retainer, a hollow plug 69 screw threaded into the bore portion 56 of the valve head for positioning the last mentioned elements and having an opening 70 in communication with the duct 62 and an upper vent opening 64 in communication with the upper portion of the casing cylinder 35, a valve stem 71 connected to the diaphragms and extending through the inlet chamber 58 and the port of the valve seat 59, a valve member 72 for the seat 59 secured to the lower end of the stem 71, and a spring 73 in the inlet chamber 58 having its upper end engaging the lower diaphragm 65 and having its lower end supported on the shoulder 57 to normally urge the valve member 72 on its seat.

The valve head 29 is operatively connected with the cam E to be raised thereby by a rod 75 having its lower end threadedly secured to the plug 69 and extending upwardly through the opening 48 of the closure 27. The upper end of the rod 75 has a bracket 76 secured thereto on which a cam roller 77 is rotatably mounted for engaging the cam E. A spring 78 acting on the valve head effects lowering thereof upon release of the roller 77 by the cam E.

The filler tube 30 is a cylindrical tubular element having its upper end secured in the valve head bore portion 61 to communicate with the chamber 60 and having its lower end positioned to extend into the bottle slightly below the filling level thereof.

The snifter tube 31 comprises a cylindrical tubular element 79 extending about the filler tube 30, a ring 80 secured within the lower end of the element 79 and in sliding engagement with the filler tube having perforations which permit gas to readily pass therethrough but substantially impervious to liquid, a collar 81 secured about the upper end of the element 79 and positioned in the chamber 39, a gasket 82 on the upper face of the collar positioned for cooperation with the lower end of the duct 62, and a pin 83 for slidably supporting the collar on the valve head 29.

The sleeve 28 is slidably retained in the lower casing section 41 and has a gasket 85 secured within the lower end thereof for engaging the neck or shoulder of the bottle 19 to form a sealed chamber about the upper end of the bottle. A spring 86 normally urges the sleeve downwardly but is adapted to yield to permit upward movement of the sleeve upon engagement by the bottle being raised by the cam D.

The housing 26 provides a shallow pocket offset laterally with respect to the casing 25; and comprises a bearing recess 88 in the bottom wall, an aperture 89 in the top wall aligned with the recess, and having an enlarged upper end for threadedly receiving a bearing bushing 90, and a side opening 91 for receiving a relief valve 92 (Fig. 6).

The cap handling mechanism comprises a shaft 95 having its lower end in the bearing recess 88 and having its upper end extending through and outwardly of the bushing 90, a pair of arcuate fingers 96 pivotally mounted on the shaft 95 arranged to be urged apart and receive and retain a crown cap 97 therebetween (Fig. 6), a spring 98 arranged to normally urge the fingers together to grip the cap, an arm 99 secured to the upper end of the shaft 95 for engaging the cam F and be rocked thereby to rotate the shaft in a manner to swing the fingers 96 and the cap 97 held therebetween away from the bottle, and spring 100 connected to the shaft 95 and the bushing 90 for normally urging the shaft in a direction to position the fingers for removing the cap from or returning the same to the bottle. Accurate alignment of the fingers with respect to the vertical axis of the bottle is attained by a stop surface 101 within the housing 26 adapted to be engaged by the finger 96 closest thereto and thereby limit the swinging movement of the fingers and rotative movement of the shaft under the influence of the spring 100.

In operation, bottles 19 with caps 97 thereon are delivered by the conveyor 20 to stations of the table 10. The lower cam D raises each bottle so that its shoulder seals against the gasket 85 on the sleeve 28 against the pressure of the spring 86, the position of sleeve 28 being below that shown in Fig. 5, whereby a chamber is formed about the open upper end of the bottle. At this instant the valve head 29 is at its uppermost position with the top of the head bearing against the gasket 51 and with a passage formed for the superheated steam through registration of inlet 44 and the port 63.

Meanwhile, the lower cam D raises the bottle further, whereby the cap is forced into and engaged by the split fingers 96. The cam D then lowers the bottle far enough to disengage the cap therefrom while the cam F operating on the arm 99 causes the cap to be swung laterally away from the bottle into its sterilizing pocket provided by the housing 26.

$CO_2$ counterpressure is supplied momentarily by the central valve C to create a counterpressure in the filling head 15 and the bottle, and to effect opening of the valve 72 by counterpressure passing up the duct 62 and acting on the upper diaphragm 68, which due to its larger area, overcomes counterpressure acting on the lower diaphragm 65 and causes the valve member 72 to be moved off its seat and admit the steam to the bottle and the filling head upon opening of the central valve B. A portion of the steam together with air is forced out of the bottle and the filling head through the relief valve 92 insuring sterilization of the filling head, the bottle, and the cap. Experiments carried out have shown that four seconds at a moderate superheat of 280° F. have proved sufficient for sterilization purposes.

The bottle is finally raised into filling position against the gasket 40, and the valve head 29 and the filling tube assembly are lowered by the spring 78 when the roller 77 is released by the cam E. The lower end of the valve head 29 now seals against the gasket 37 and the port 63 communicates with the beer inlet 45. Upon opening of the central valve A, with the valve member 72 unseated by the counterpressure again acting on the upper diaphragm 68, filling of the bottle now commences.

As the bottle fills, the counterpressure is displaced through the annular space between the filling tube 30 and the snifter tube 31 which slides on it. When the beer reaches the porous ring 80, it raises the same to cause the snifter tube to be moved upwardly whereby the gasket 82 on the snifter tube collar 81 seals the lower end of the duct 62. This shuts off the supply of counter-pressure to the upper diaphragm, and, upon pressure fluid previously acting on this diaphragm being dissipated through the opening 64 and the vent 49, the valve member 72 is seated by its spring 73 to shut off the beer supply whereby the filling level of the bottle is automatically controlled.

The cam E now raises the valve head 29 to withdraw the filling tube assembly to its previous top position; the bottle is lowered by the cam D; and the cap holder, which has been pressing against the neck of the throttle, is returned by the spring 100 to position the cap above the bottle. The bottle, still under counterpressure, is now raised by the cam D to drive the cap out of engagement of the fingers 96 and against a crowning ring 102 within the filling chamber which seals the cap to the mouth of the bottle. The bottle is then lowered out of the sleeve 28 and is discharged upon the conveyor 20 which effects removal thereof from the filling and capping machine.

In Fig. 7, the operating cycle just described is depicted diagrammatically to illustrate the raising and lowering or other operations of elements under the influence of the cams D, E, and F and to illustrate the opening and closing of the valves A, B and C in relation to the circumferential travel of the bottles. Since the machine described herein is of the type which has for example, fifty filling stations, fifty bottles are acted upon progressively at the same time to effect filling and sealing thereof at a rapid rate.

From the foregoing description, it will be seen that the present invention provides a practical and reliable machine for filling bottles with beer or other liquids in an entirely sterile manner. The interior portions of the bottle and the cap portions which the liquid comes in contact with are maintained sterile throughout the filling and capping process whereby further pasteurization or sterilization of the bottled contents is not required. The filling heads and operating devices therefor are simple and economical in construction and may be readily embodied in existing or newly constructed filling machines of the rotary type.

As various changes may be made in the form, construction and arrangement of the parts herein, without departing from the spirit and scope of the invention and without sacrificing any of its advantages, it is to be understood that all matters are to be interpreted as illustrative and not in any limiting sense.

What is claimed is:

1. In a container filling machine, a filling head casing including means for receiving the upper end of a container to provide a chamber therefor and having an opening to said chamber, a first inlet above said opening and in communication therewith, a second inlet spaced upwardly from said first inlet and a third inlet spaced from said second inlet; a piston movably mounted in said casing above said opening having a passageway formed with an inlet and an outlet, said passageway inlet being arranged to be selectively moved into registry with said second and third casing inlets; means for moving said piston to selectively place its passageway inlet in registry with said second and third casing inlets; filling tube means connected to said passageway outlet and extending through said casing opening and having an opening in communication with said first casing inlet; said filling tube means comprising a filling tube rigidly secured to said piston and a snifter tube coaxially disposed and slidably mounted with respect to said filling tube; and means for supplying a different fluid to each of said casing inlets in a predetermined timed relationship.

2. A machine according to claim 1, wherein means are associated with the chamber of said casing for removing a closure for the container therefrom and for replacing the same.

3. A machine according to claim 1, wherein a valve is arranged in said piston for controlling the passageway thereof.

4. A machine according to claim 3, wherein said valve has a pair of fluid pressure actuated diaphragms of unequal area and conduit means provide communication between said diaphragms and said first casing inlet to effect operation of said valve by fluid entering said first casing inlet.

5. A machine according to claim 4, wherein said fluid supplying means include sources of compressed gas, liquid with which the container is to be filled and steam which are respectively connected to said first, second and third casing inlets.

6. A machine according to claim 4, wherein valve means are associated with said snifter tube for controlling the flow of fluid through said conduit means.

7. In a container filling machine, the combination of a filling head casing including means for providing a chamber about the open end of a container; a piston movably mounted in said casing having a passageway formed with an inlet and an outlet; filling tube means connected to said passageway outlet including first and second coaxially spaced apart tubular elements for extending into the container opening, said first tubular element being slidable with respect to said second tubular element and said second tubular element being secured to said movable piston; means for directing a gas under pressure through said first element; and means for selectively directing steam and a liquid with which the container is to be filled through said passageway and second element.

8. A machine according to claim 7, wherein a valve controls fluid flow through said second element and a pair of spaced apart fluid pressure actuated diaphragms of unequal area operate said valve including means for establishing fluid flow communication with said first element whereby compressed gas is adapted to actuate said valve operating diaphragms.

9. A machine according to claim 7, and a perforated element positioned between said first and second tubular elements, said perforated elements being pervious to gas and substantially impervious to liquid.

10. In a container filling machine, the combination of a rotatable table, a plurality of container filling heads on said table each including means providing a chamber about the open end of a container, means for supporting a container beneath each head, means including valving controlled by the rotation of said table for selectively applying a counter-pressure and for directing liquid with which the containers are to be filled and also for directing steam into the containers at predetermined intervals, said valve comprising a common passageway for steam and liquid, valve element means for selectively positioning said passageway for directing steam and liquid respectively therethrough, means including a cam for controlling said valve element means, a valve member in said passageway, fluid pressure actuated means for operating said valve member, and conduit means for establishing fluid flow communication between said valve member operating means and said counter-pressure applying means.

11. A machine according to claim 10, wherein means for provided in said chamber for removing a closure from the container and replacing it thereon.

12. A machine according to claim 11, including cam means for effecting operating of said last mentioned means.

13. A machine according to claim 11, wherein the counter-pressure applying means are compressed gas directing means, and means are provided for establishing fluid flow communication between said chamber and said compressed gas directing means to maintain the closure in an atmosphere of gas while removed from the container.

References Cited in the file of this patent

UNITED STATES PATENTS

| Number | Name | Date |
|---|---|---|
| 863,884 | Schneider | Aug. 20, 1907 |
| 921,032 | Webster et al. | May 11, 1909 |
| 1,120,597 | Carper | Dec. 8, 1914 |
| 1,621,470 | Shields | Mar. 15, 1927 |
| 1,793,684 | Dunn | Feb. 24, 1931 |
| 1,962,161 | Thompson | June 12, 1934 |
| 2,140,187 | Kantor | Dec. 13, 1938 |
| 2,204,832 | Stewart | June 18, 1940 |
| 2,319,075 | McKinnis | May 11, 1943 |
| 2,444,155 | De Back | June 29, 1948 |
| 2,505,799 | Smith | May 2, 1950 |
| 2,597,943 | Meyer | May 27, 1952 |